US012683532B2

(12) United States Patent
Bhatt et al.

(10) Patent No.: US 12,683,532 B2
(45) Date of Patent: Jul. 14, 2026

(54) MOTOR WINDING NEUTRAL SWITCHING

(71) Applicant: EATON INTELLIGENT POWER LIMITED, Dublin (IE)

(72) Inventors: Darshan Harish Bhatt, Chandur Bazar (IN); Nilesh Dattatraya Karale, Shrigonda (IN); Girish Potdar, Mundhwa (IN); Richard Strong Wallace, Jr., Saint Joseph, MI (US)

(73) Assignee: Eaton Intelligent Power Limited, Dublin (IE)

( * ) Notice: Subject to any disclaimer, the term of this patent is extended or adjusted under 35 U.S.C. 154(b) by 279 days.

(21) Appl. No.: 18/486,639

(22) Filed: Oct. 13, 2023

(65) Prior Publication Data

US 2024/0128911 A1     Apr. 18, 2024

(30) Foreign Application Priority Data

Oct. 14, 2022    (IN) .............................. 202211058717

(51) Int. Cl.
| | |
|---|---|
| *H02P 25/18* | (2006.01) |
| *H02K 1/17* | (2006.01) |
| *H02K 11/33* | (2016.01) |
| *H02P 25/22* | (2006.01) |

(52) U.S. Cl.
CPC ............... *H02P 25/18* (2013.01); *H02K 1/17* (2013.01); *H02K 11/33* (2016.01); *H02P 25/22* (2013.01)

(58) Field of Classification Search
CPC ...... B62D 5/0484; B62D 5/0487; H02K 1/17; H02K 11/33; H02P 25/18; H02P 25/22; H02P 29/024
See application file for complete search history.

(56) References Cited

U.S. PATENT DOCUMENTS

| | | | | |
|---|---|---|---|---|
| 4,517,471 A | * | 5/1985 | Sachs ..................... | H02K 47/18 |
| | | | | 323/201 |
| 2004/0257018 | A1* | 12/2004 | Tobias ................. | B62D 5/0484 |
| | | | | 318/400.29 |
| 2007/0030606 | A1 | 2/2007 | Ganev et al. | |
| 2011/0163703 | A1* | 7/2011 | Uang ..................... | H02P 25/18 |
| | | | | 318/400.3 |
| 2014/0097776 | A1 | 4/2014 | Hayashi | |
| 2015/0012161 | A1* | 1/2015 | Kanekawa ........... | B62D 5/0487 |
| | | | | 180/443 |

FOREIGN PATENT DOCUMENTS

CN            107968539 A  *  4/2018   ............... H02K 3/28

OTHER PUBLICATIONS

CN-107968539-A, all pages (Year: 2018).*
Canadian Office Action/Examination Search Report (Canadian Application No. 3,216,379), Dated Apr. 17, 2025; 4 Pages.
Extended European Search Report for Application No. 23203619.4 mailed Mar. 1, 2024.

* cited by examiner

*Primary Examiner* — Naishadh N Desai
(74) *Attorney, Agent, or Firm* — Merchant & Gould P.C.

(57) ABSTRACT

A motor system includes a stator and a rotor situated to rotate relative to the stator. A plurality of phase windings are situated in the stator with a power circuit connected to the phase windings. A controller is configured to output control signals to the power circuit to selectively energize the phase windings to cause the rotor to rotate relative to the stator. A neutral switch circuit is connected between the phase windings and a neutral node and is configured to selectively disconnect the phase windings from the neutral node.

20 Claims, 6 Drawing Sheets

400

Provide Three Phase BLDC Motor — 410

Provide First Switch — 412

Provide Second Switch — 414

Provide Third Switch — 416

Provide Fourth Switch — 418

Connect Windings to Neutral Node — 420

Disconnect Windings from Neutral Node in Resp to Winding Fault — 422

MOTOR WINDING NEUTRAL SWITCHING

CROSS-REFERENCE

This application claims priority to Indian Patent Application No. 202211058717, filed on Oct. 14, 2022, which is incorporated by reference in its entirety.

BACKGROUND

Electric motors are in a variety of applications, such as actuators for driving or positioning various components in automobiles or aircraft. Many motor applications are critical and thus require back-up systems in case of a motor failure. In some instances, back-up or redundant motors may be provided so that, in the event of failure of one motor, the back-up motor is available to provide the required functions. However, providing additional motors may not be practical due to restrictions on space, weight, cost, etc.

Various types of motors operate through the interaction between a magnetic field (e.g. provided by permanent magnets) and an electric current in motor windings to generate force in the form of torque applied on the motor's shaft. To provide redundancy, some motors employ redundant sets of windings. Thus, if a failure (e.g. a winding open or a phase-to-phase short circuit) occurs in a primary winding set, the primary winding may be disconnected and the redundant winding can provide the required motor operation.

SUMMARY

In accordance with some aspects of the present disclosure, a motor system includes a stator, a rotor situated to rotate relative to the stator, and a plurality of phase windings. A power circuit is connected to the phase windings. A controller is configured to output control signals to the power circuit to selectively energize the phase windings to cause the rotor to rotate relative to the stator. A neutral switch circuit is connected between the phase windings and a neutral node and configured to selectively disconnect the phase windings from the neutral node.

In accordance with further aspects, a motor control system includes a first switch having a first terminal and a second terminal. The first terminal is configured for connection to a first phase winding of a three phase brushless DC (BLDC) motor. A second switch has a first terminal and a second terminal, with the first terminal configured for connection to a neutral node of the BLDC motor. The second terminal is connected to the second terminal of the first switch. A third switch has a first terminal and a second terminal, with the first terminal configured for connection to a second phase winding of the BLDC motor. A fourth switch has a first terminal and a second terminal, with the first terminal configured for connection to the neutral node of the BLDC motor and the second terminal connected to the second terminal of the third switch. A controller is configured to output a control signal to the first, second, third and fourth switches to selectively disconnect the first and second phase windings of the BLDC motor from the neutral node in response to a fault in at least one phase winding of the BLDC motor.

A method for operating a motor includes providing a three phase brushless DC (BLDC) motor having first, second and third phase windings. First, second, third and fourth switches, such as MOSFETs, are provided. A first MOSFET has a drain terminal and a source terminal, with the drain terminal connected to the first phase winding. A second MOSFET has a drain terminal and a source terminal, with the drain terminal connected to a neutral node of the BLDC motor and the source terminal connected to the source terminal of the first MOSFET. A third MOSFET has a drain terminal and a source terminal, with the drain terminal connected to the second phase winding. A fourth MOSFET has a drain terminal and a source terminal, with the drain terminal connected to the neutral node of the BLDC motor and the source terminal connected to the source terminal of the third MOSFET. A first control signal is output to the first, second, third and fourth MOSFETs to connect the first and second phase windings to the neutral node. A second control signal is output to the first, second, third and fourth MOSFETs to selectively disconnect the first and second phase windings from the neutral node in response to a fault in at least one of the first, second and/or third phase windings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the invention and are not intended to be limiting.

DETAILED DESCRIPTION

Figure 1:
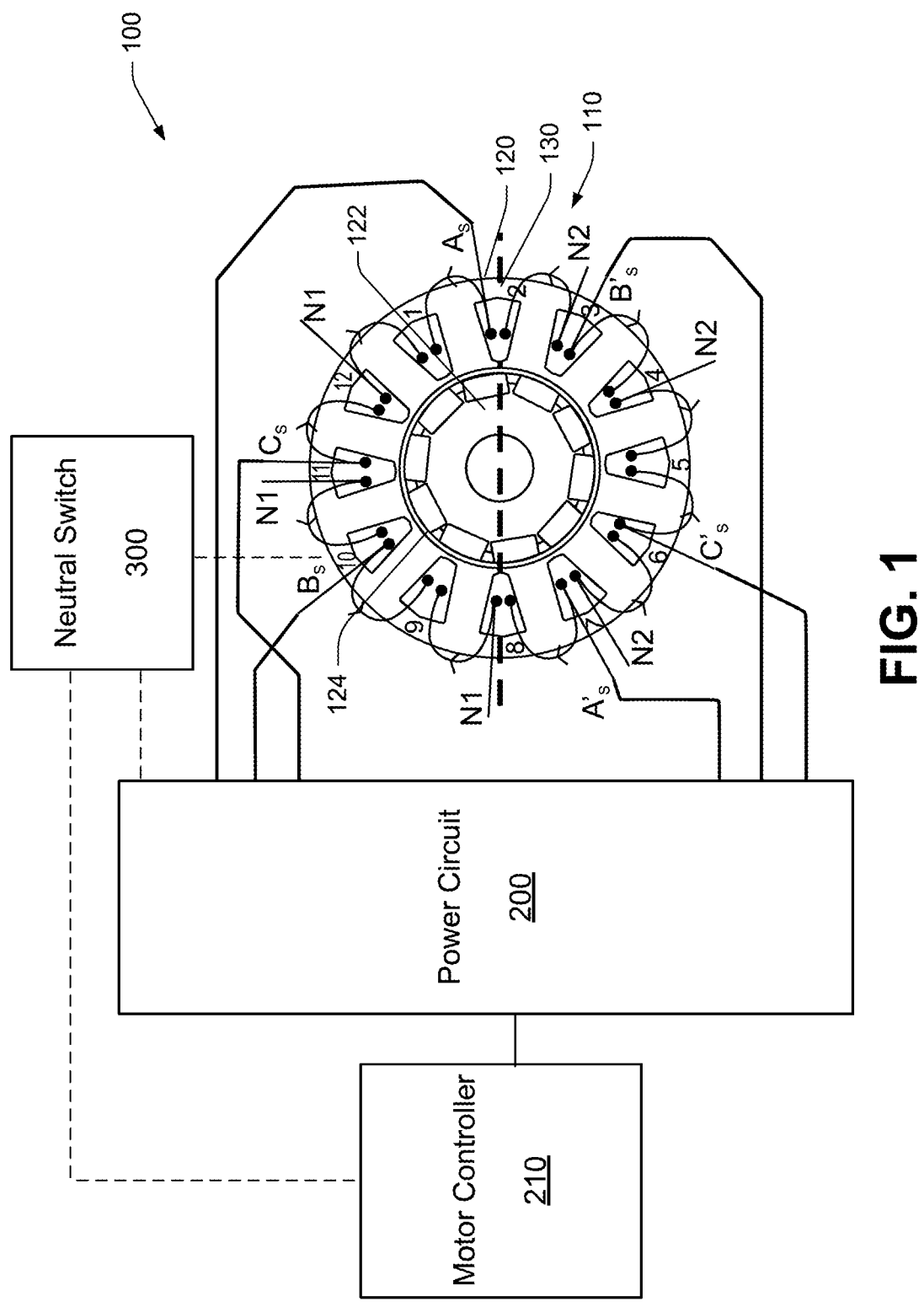
FIG. 1 is a circuit diagram illustrating an example of a motor system in accordance with aspects of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Electric motors operate through the interaction between a magnetic field (e.g. provided by permanent magnets) and an electric current in motor windings to generate force in the form of torque applied on the motor's shaft. To provide redundancy in motor applications, some motors employ redundant sets of windings (i.e. a "dual wound motor"). Thus, if a failure (e.g. a winding open or a phase-to-phase short circuit) occurs in a primary winding set, the primary winding may be disconnected and the redundant winding can provide the required motor operation.

FIG. 1 illustrates aspects of an example dual wound BLDC motor system 100 in accordance with the present disclosure. The motor system 100 includes an electric motor, such as a BLDC motor 110. The motor 110 includes a stator 120 and a rotor 122 situated within a central opening of the stator 120 to rotate relative to the stator 120. In the illustrated example, the rotor 122 further includes a plurality of permanent magnets 124 situated around its periphery.

The stator 120 has a plurality of slots numbered 1-12 in the illustrated example. A plurality of phase windings are arranged in the slots 1-12. In the embodiment shown in FIG. 1, the motor 110 is a three phase, dual wound BLDC motor. As such, the plurality of phase windings includes two sets of windings: a first winding set including three phase windings A, B and C, and a second winding set including three phase windings A', B' and C'. In the example of FIG. 1, the stator 120 is symmetrical about a dashed horizontal line 130. For convenience, the first windings A, B and C are shown situated in the slots above the line 130, and the second windings A', B' and C' are shown situated in the slots below the line 130. However, as the dual wound motor 110 includes redundant windings, each of the slots 1-12 accommodates windings from both the first and second winding sets A, B and C and A', B' and C'.

A power circuit 200 is connected to one end of each of the phase windings A, B and C and A', B' and C'. As will be discussed further below, the other ends of the phase windings are connected to respective neutral nodes N1 and N2. More specifically, the first phase windings A, B and C are each connected to a first neutral node N1, and the second phase windings A', B' and C' are each connected to a second neutral node N2.

A controller 210 is configured to output control signals to the power circuit 200 to selectively energize the phase windings A, B, C and A', B', and C' to cause the rotor 122 to rotate relative to the stator 120. The controller 210 may be implemented using a suitable processing device, such as a microcontroller, microprocessor, or other programmed computing device. The system 100 further includes a neutral switch circuit 300 connected between the phase windings and the neutral node N1, N2. The neutral switch circuit 300 may be incorporated into the motor 120, for example, or may be situated external thereto such as a part of the power circuit 200 and/or controller 210. The neutral switch circuit 300 is configured to selectively disconnect the phase windings A, B and C and A', B' and C' from the respective neutral nodes N1, N2.

Certain winding failures, such as a phase-to-phase short circuit, can create an "asymmetric" fault, resulting in an unbalanced magnetic pull on the motor's rotor. This can lead to high torque ripples, among other things. More specifically, each of the phase windings of an electric motor, such as the BLDC 110, is connected to the common neutral node N1, N2 as discussed above. As the rotor 122 rotates relative to the stator 120, the rotor magnets 124 create a back EMF in the phase windings A, B and C and A', B' and C'.

Figures 2, 3:
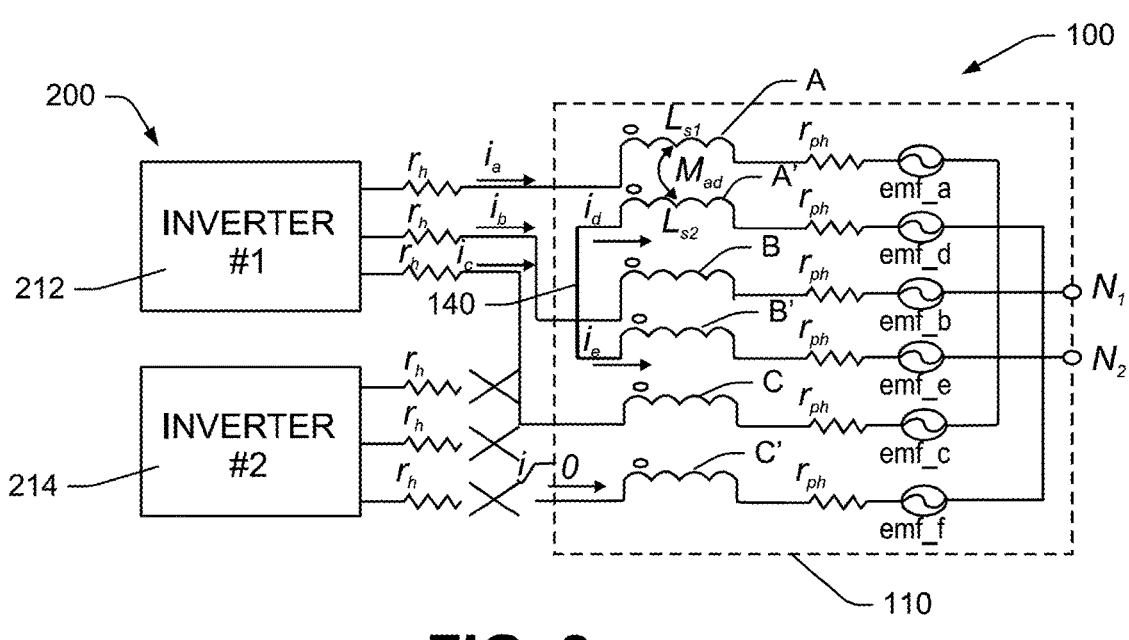
FIG. 2 is a schematic diagram illustrating further aspects of an example of the motor system shown in FIG. 1.
FIG. 3 is a schematic diagram illustrating further aspects of an example of the motor system shown in FIG. 1.

FIG. 2 illustrates further aspects of an example of the motor system 100. The motor 110 includes the first and second sets of phase windings A, B and C and A', B' and C', with phase resistance represented by resistors rph. The motor controller 210 includes first and second inverters 212 and 214. The inverters 212, 214 are configured to output energization signals to the phase windings A, B and C and A', B' and C'.

In the example of FIG. 2, the first set of phase windings A, B and C are "healthy"—i.e. no faults in the windings. The second set of phase windings A', B' and C' has a fault, such as a phase-to-phase short indicated at 140. Due to the fault 140, the second inverter 214 is disconnected from the second phase windings A', B' and C' and the desired motor operation is achieved using the first phase windings A, B and C. The second inverter 214 could simply be disconnected from input power, or switches could be provided to disconnect the inverter 214 from the second phase windings A', B' and C'. Thus, phase energization currents $i_a$, $i_b$ and is flow from the first inverter 212 to the respective first phase windings A, B and C, and there is no current flow from the second inverter 214 to the second phase windings A', B' and C'. Since the two winding sets A, B and C and A', B' and C' provide redundant phase windings, the healthy set of windings A, B and C provides the required motor operation (i.e. torque and speed) to continue operation of the motor 110 in the event of the failure 140 in the second windings set A', B' and C'.

If the first and second phase windings A, B and C and A', B' and C' remain connected to their respective neutral nodes N1 and N2, the back EMF (i.e. $emf_d$, $emf_e$) generated in the corresponding phase windings A' and B' by the rotating rotor magnets 124 will cause currents $i_d$ and $i_e$ to flow in these windings. This induced EMF is directly proportional to the speed of the rotor 122, so the back EMF increases with increases in motor speed. As a result of the short circuit 140, current will thus flow in the motor winding and will generate static torque on the rotor 122.

FIG. 3 illustrates the motor system 100 shown in FIG. 2, with the neutral switch circuit 300 activated. In FIG. 3, the neutral switch circuit 300 is shown conceptually with three switches 302, 304 and 306. In response to the fault 140, the neutral switch circuit 300 opens the switches 302, 304 and 306 to disconnect the second phase windings A', B' and C' (including default 140) from the neutral node N2. As such, there is no path for current resulting from back emf to flow in the second windings A', B' and C'. This provides a true active redundant architecture. The open switches 302, 304 and 306 of the neutral switch circuit 300 interrupts the flow of current and the second windings set A', B' and C' and acts as an open circuit connection as shown in FIG. 3. With such an open circuit, the motor 110 has a torque ripple equivalent to a normal operating mode.

Figure 4:
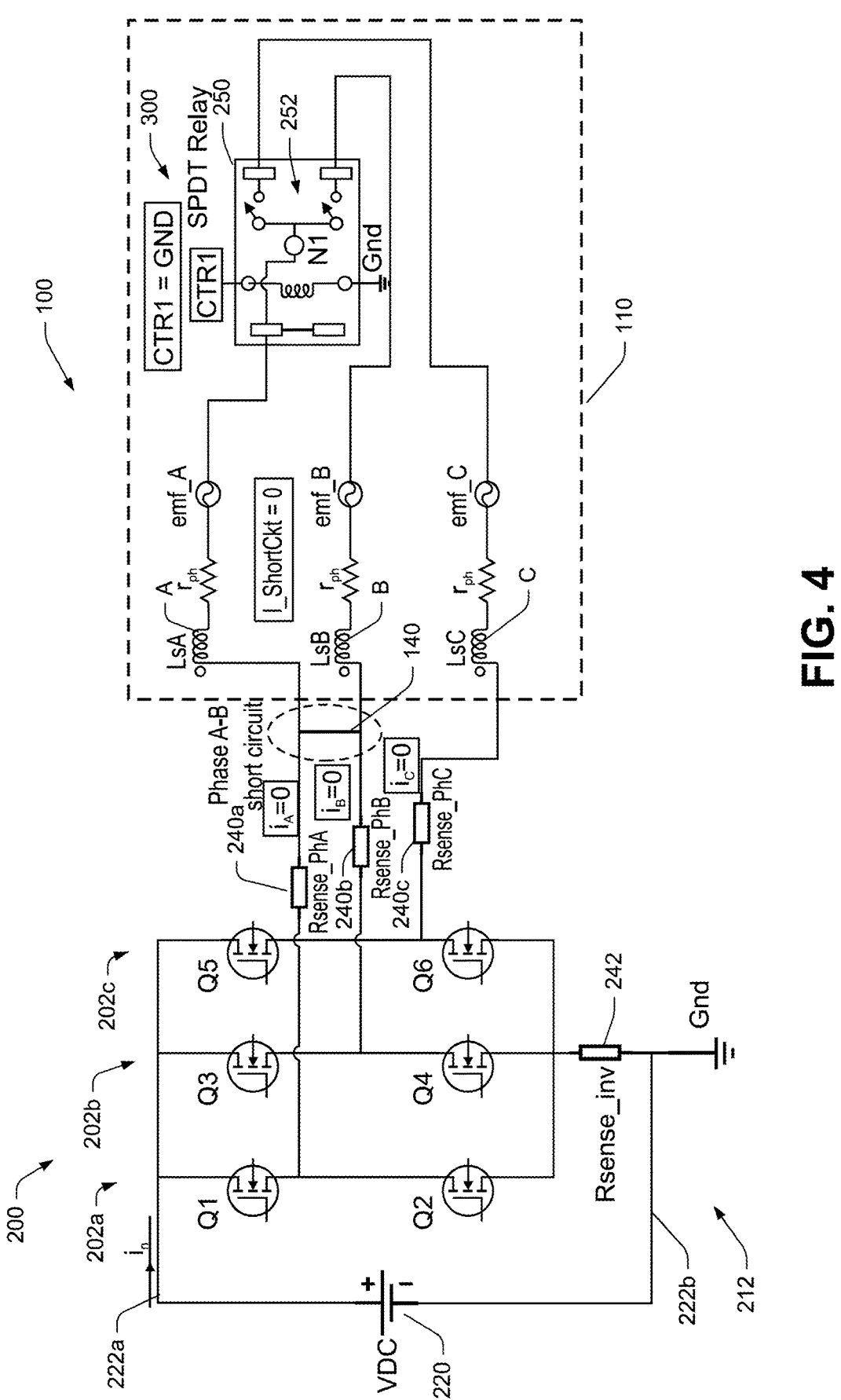
FIG. 4 is a schematic diagram illustrating further aspects of an example of the motor system shown in FIG. 1.

FIG. 4 illustrates an example of the motor system 100 including a neutral switch circuit 300 using a relay circuit 250. In FIG. 4, only one of the winding sets A, B and C, A', B' and C' is shown for convenience, with the three phase windings labeled A, B and C. The other winding set is arranged similarly. Moreover, only one of the first and second inverters 212, 214 of the power circuit 200 is shown in FIG. 4, since the first inverter 212 and the second inverter 214 are identical in some implementations. For simplicity, the inverter shown in FIG. 4 is referred to as the "inverter 212" in this discussion.

In the embodiment shown in FIG. 4, the inverter 212 is a three phase inverter configured to output energization signals to each of the motor phase windings A, B and C. More particularly, the inverter 212 is configured to transfer energy from a DC voltage source 220 into instantaneous, multi-phase, alternating current (AC) power for the phase windings A, B and C.

The DC voltage source 220 is connected between upper and lower power rails 222a and 222b. The lower power rail 222b is connected to ground. The inverter 212 is configured to convert DC power from the DC power source 220 into AC power to generate a rotating magnetic field for the motor 110. In certain examples, motor speed, phase voltages, and phase currents are sensed in order to realize closed loop controls of the motor variables such as speed and torque. An encoder may provide motor position information to the controller 210 (shown in FIG. 1), and based thereon, operation of power switches is controlled to achieve the desired operation of the motor 110.

The inverter 212 includes three branches or legs 202a, 202b and 202c (collectively inverter legs 202), each of which has two power switches connected in series between the upper and lower power rails 202a, 202b. More specifically, the first inverter leg 202a includes switches Q1 and Q2, the second inverter leg 202b includes switches Q3 and Q4, and the third inverter leg 202c includes switches Q5 and Q6. The switches may include, for example, bipolar transistors, IGBTs, MOSFETs, SiC, etc. In the example of FIG. 4, the switches Q1-Q6 are MOSFETs.

To control the current and voltage applied to the motor 110, the motor controller 210 generates PWM signals that are applied to gate terminals of the switches Q1-Q6 such that the switches in the motor's bridge are PWM controlled to provide the desired voltage and current to the motor windings A, B and C.

As noted above, the neutral switch circuit 300 is operated based on sensing a windings fault. In some examples, phase current is monitored based on sense resistors 240a, 240b and 240c for the respective A, B and C phases of the motor 110, as well as an inverter sense resistor 242.

In FIG. 4, the neutral switch circuit 300 is shown as being positioned within the motor 110. Other locations for the neutral switch circuit 300 are within the scope of the disclosure. The relay circuit 310 of the neutral switch circuit 300 may include various types of relay circuits, such as SPDT, 3PST, SPST, etc. The example shown in FIG. 4 employs an SPDT relay circuit 250, which provides a simple implementation using a single relay, which may be implemented in a small package and is easily controllable. As noted above, the example shown in FIG. 4 illustrates only the one phase winding A, B and C of the dual winding motor 110. A similar relay circuit 250 may be used for the other phase winding set A', B' and C'.

FIG. 4 illustrates a short 140 between phases A and B. When this short circuit 140 is detected by the motor controller 210, for example, based on current flow through the sense resistors 240a-240c and 242, the controller 210 provides a CTR1 command to the normally closed relay 250. In response to the CTR1 command, the relay 250 contacts 252 open. Accordingly, there is no current path for the short circuit current generated by back EMF in the phase windings A, B and C. Note that while FIG. 3 illustrates three switches 302, 304 and 306 opening to separate each of the second phase windings A', B' and C' from the neutral node N2, it is necessary to separate only two of the phase windings from the corresponding neutral node, as this results in no current path between the phase windings A, B and C.

Figure 5:
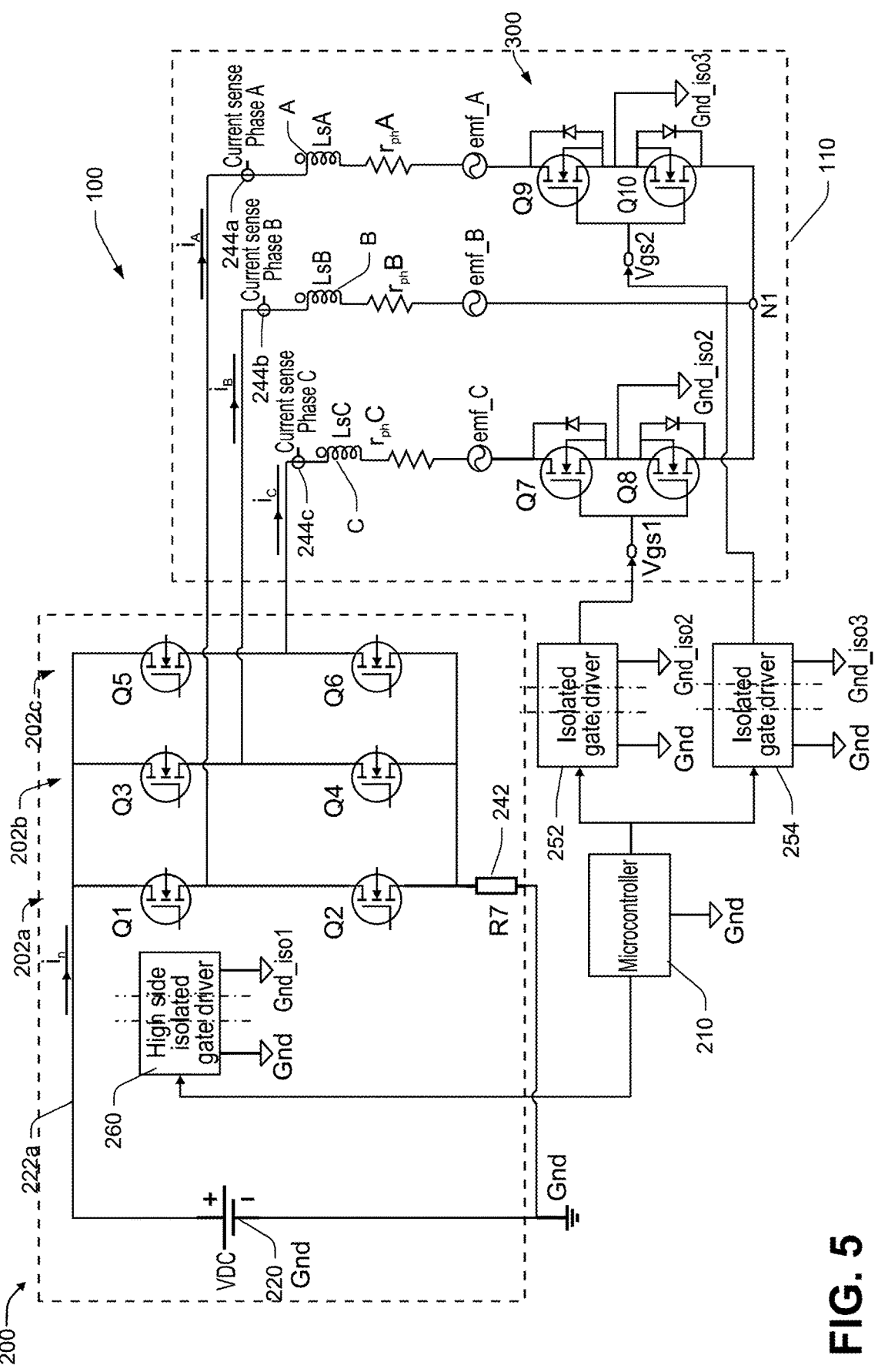
FIG. 5 is a schematic diagram illustrating further aspects of another example of the motor system shown in FIG. 1.

FIGS. 5-8 illustrate another neutral switch circuit 300 using MOSFETs. The inverter 212/214 of the power circuit 200 shown in FIG. 5 is similar to that shown in FIG. 4 and as such, is not described in detail here. As shown in FIG. 5, two sets of MOSFETs Q7/Q8 and Q9/Q10 are connected between the phase windings A and C and the winding neutral node N1 to selectively disconnect the phase windings A, B and C from the neutral node N1 in the case of a windings fault. The MOSFETs Q7-Q9 provide current flow in one direction i.e., from drain to source. However, motor phase current is bidirectional. The illustrated switching arrangement provides bidirectional switches using NMOS MOSFETs Q7-Q9 connected in series with the motor phases A, B and C. As used herein, the source/drain terminals of the various disclosed MOSFETs may refer to a source or a drain of the respective MOSFET, individually or collectively dependent upon the context.

Figure 7:
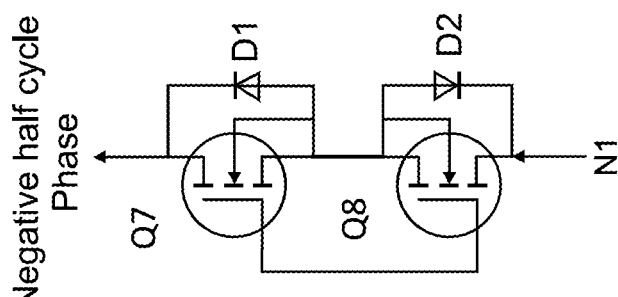
FIG. 7 is a schematic diagram illustrating the MOSFET switches shown in FIG. 6 in a second current flow condition.
Figure 6:
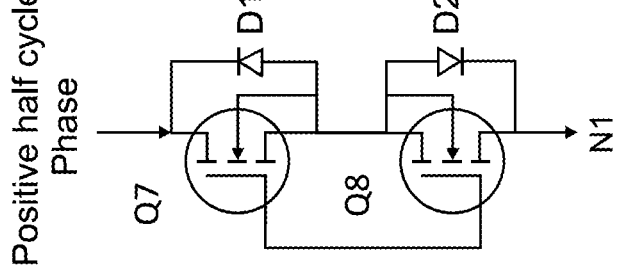
FIG. 6 is a schematic diagram illustrating MOSFET switches of the example shown in FIG. 5 in a first current flow condition.

More particularly, FIGS. 6 and 7 illustrate an example connection of a bidirectional switching arrangement using NMOS MOSFETs. FIGS. 6 and 7 illustrate MOSFETs Q7 and Q8, which as shown in FIG. 5, are connected in series between the phase C winding and the neutral node N1. The arrangement of the MOSFETs Q9 and Q10 connected in series between the phase A winding and the neutral node N1 as shown in FIG. 5 is identical. Moreover, while FIG. 5 shows the MOSFET pairs Q7/Q8 and Q9/Q10 connected respectively between the phase C and A windings and the neutral node N1, the MOSFET pairs could be connected between any two of the phase windings A, B and C and the neutral node N1, as only two of the phase windings A, B and C need to be disconnected from the neutral node N1 in response to a windings fault.

Figure 8:
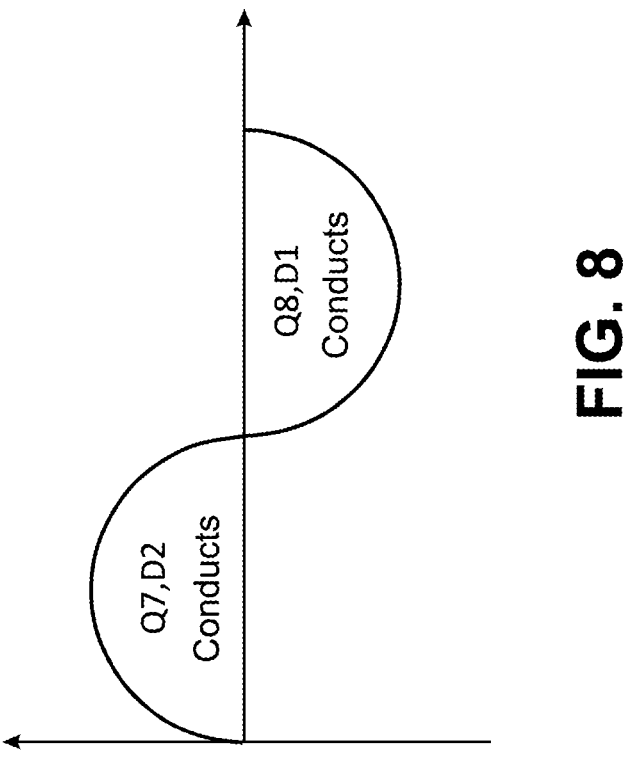
FIG. 8 is a waveform diagram illustrating conduction of the MOSFET switches shown in FIGS. 6 and 7.

Referring again to FIGS. 6-8, when phase current in the phase winding C is positive, current flows through the MOSFET Q7 and the diode D2 as shown in FIGS. 6 and 8. Note that in the example shown in FIGS. 6, the diodes D1 and D2 are intrinsic body diodes of the respective MOSFETs Q7 and Q8. In other implementations, discrete external diodes are connected in parallel with respective MOSFETs Q7 and Q8 in the manner shown in FIGS. 6 and 7. Using external diodes D1 and D2 may provide improved performance in terms of reduced voltage drop. When the phase C current is negative, phase current flows through the MOSFET Q8 and the diode D1 as shown in FIGS. 7 and 8.

Referring again to FIG. 5, the motor controller 210 provides control signals to a high side isolated gate driver circuit 260, which outputs PWM signals to the gate terminals of the upper inverter switches Q1, Q3 and Q5. A low side isolated gate driver (not shown in FIG. 5 for simplicity) similarly outputs PWM signals to the gate terminals of the lower inverter switches Q2, Q4 and Q5. Thus, the switches Q1-Q6 are PWM controlled to provide the desired voltage and current to the motor windings A, B and C. For example, if a windings fault is detected by the motor controller 210, such as based on phase currents determined by phase sensors 244a, 244b and 244c, the upper gate driver circuit 260 (and the lower gate driver circuit) could be controlled to output gate control signals to turn off the inverter switches Q1-Q6 so no energization signals are provided to the faulty phase windings A, B and C.

As noted above, in the case where a windings fault is detected, the neutral switch circuit 300 is further controlled to disconnect the phase windings A, B and C from the neutral node N1. To this end, the motor controller 210 further provides control signals to isolated gate drivers 252 and 254. In the case of a detected windings fault, the motor controller 210 controls the isolated gate drivers 252 and 254 so as to output gate control signals Vgs1 and Vgs2 to the respective MOSFET pairs Q7/Q8 and Q9/Q10, turning the MOSFETs off to prevent current flow therethrough. In this manner, the phase windings A, B and C are disconnected from the neutral node N1, preventing unwanted current flow through the phase windings A, B and C resulting from back EMF.

In normal operation (i.e. no winding faults), all of the MOSFETs Q7-Q10 are continuously biased ON and phase current $I_A$, $I_B$ and $I_C$ flows in the windings A, B and C. In case of a windings fault such as a phase-to-phase short circuit, phase current increases and is detected by the motor controller 210 using the phase current sensors 244a-244c, for example. The motor controller 210 sends an OFF command to the appropriate isolated gate driver circuits 252, 254 and the MOSFETs Q1-Q6 of the inverter 212 as well as the MOSFETs Q7-Q10 of the neutral switch circuit 300 turn OFF. When the MOSFETs Q7-Q10 are OFF, no current flows through the phase windings A, B and C since there is no current path from the windings neutral node N1.

The MOSFET arrangement shown in FIGS. 5-8 is one example embodiment. Other arrangements are within the scope of the disclosure. For instance, the illustrated MOSFETs Q7-Q10 are NMOS devices. In alternative embodiments, the switches could be PMOS MOSFETs, in which case the polarity of the control signals would be inverse. In other examples, the MOSFETs may be connected with the drain terminals of the MOSFETs Q7 and Q9 connected to the respective phase C and phase A windings as shown in FIG. 5, with the source terminals of the MOSFETs Q8 and Q10 connected directly to the respective phase C and phase A windings. Further, the drain terminals of the MOSFETs Q8 and Q10 may be connected directly to the neutral node N1 as shown in FIG. 5, with the source terminals of the MOSFETs Q7 and Q9 also directly connected to the neutral node N1. In still further alternative embodiments, the switches of the neutral switch circuits include IGBTs with an external diode connected in parallel with the associated IGBTs.

Figure 9:
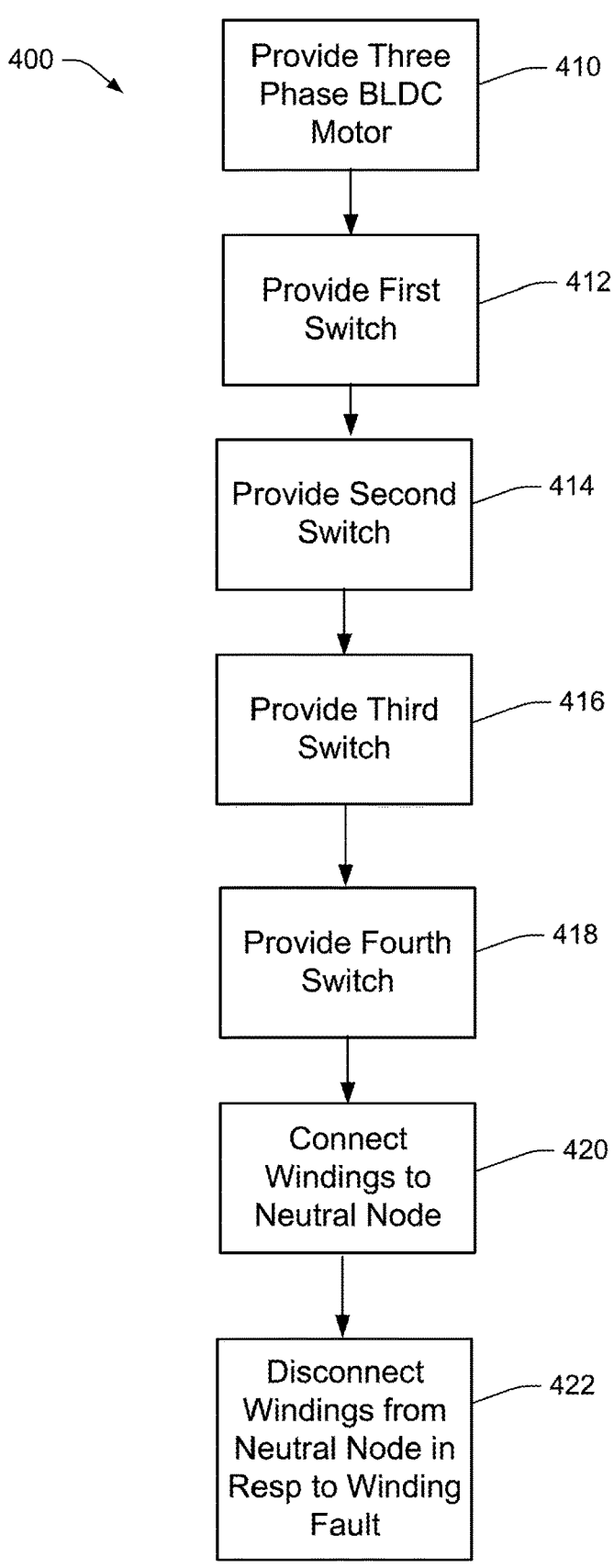
FIG. 9 is a flow diagram illustrating an example of a method in accordance with aspects of the present disclosure.

FIG. 9 illustrates a method 400 in accordance with aspects of the disclosure. More specifically, the method 400 illustrated in FIG. 9 generally expresses aspects of the devices discussed above in terms of a method. For instance, in an operation 410, a three phase BLDC motor is provided, such as the motor 110. As noted above, the example 3 phase BLDC motor has first, second and third phase windings. In operation 412, a first switch, such as the first MOSFET Q7 is provided. The MOSFET Q7 has a drain terminal and a source terminal, with the drain terminal connected to the first phase winding (e.g. phase C). In operation 414, a second switch, such as the second MOSFET Q8 is provided. The second MOSFET Q8 has a drain terminal and a source terminal, with the drain terminal connected to the neutral node N1 of the BLDC motor and the source terminal connected to the source terminal of the MOSFET Q7. A third switch, such as the third MOSFET Q9 is provided in operation 416. The MOSFET Q9 has a drain terminal and a source terminal, with the drain terminal connected to a second phase winding (e.g. phase A). In operation 418, a fourth switch is provided, such as the fourth MOSFET Q10. The MOSFET Q10 has a drain terminal and a source terminal, with the drain terminal connected to the neutral node N1 of the BLDC motor and the source terminal connected to the source terminal of the MOSFET Q9. A first control signal is output by the controller 210 to the MOSFETs Q7-Q10 to connect the phase A and C windings to the neutral node N1 in operation 420, and in operation 422, the controller 210 outputs a second control signal to the MOSFETs Q7-Q10 to selectively disconnect the phase A and C windings from the neutral node N1 in response to a fault in at least one of the phase windings.

The foregoing outlines features of example embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A motor system, comprising:
a stator including a plurality of permanent magnets;
a rotor situated to rotate relative to the stator;
a plurality of phase windings including first, second and third phase windings situated in the Stator,
a power circuit connected to the phase windings;
a controller configured to output control signals to the power circuit to selectively energize the phase windings to cause the rotor to rotate relative to the stator; and
a neutral switch circuit connected between the phase windings and a neutral node and configured to selectively disconnect the phase windings from the neutral node, wherein the neutral switch circuit includes:
first and second switches connected in series between the first phase winding and the neutral node; and
third and fourth switches connected in series between the second phase winding and the neutral node.

2. The system of claim 1, wherein the controller is configured to disconnect the phase windings from the neutral node in response to a fault in the plurality of phase windings.

3. The system of claim 1, wherein the power circuit includes a power inverter.

4. The system of claim 3, wherein the controller is configured to disconnect the phase windings from the power inverter in response to a fault in the plurality of phase windings.

5. The system of claim 1, wherein the first, second and third phase windings each include a main winding and a redundant winding.

6. The system of claim 1, wherein the neutral switch circuit is not connected between the third phase winding and the neutral node.

7. The system of claim 6, wherein the neutral switch circuit includes a single pole double throw (SPDT) relay connected between the first and second phase windings and the neutral node.

8. The system of claim 1, wherein the first, second, third and fourth switches comprise respective first, second, third and fourth MOSFETs;

wherein the first MOSFET has a drain terminal connected to the first phase winding, and a source terminal connected to a source terminal of the second MOSFET;

wherein the second MOSFET has a drain terminal connected to the neutral node; and wherein the third MOSFET has a drain terminal connected to the second phase winding, and a source terminal connected to a source terminal of the fourth MOSFET.

9. The system of claim 8, further comprising:

a first diode having a cathode terminal connected to the drain terminal of the first MOSFET, and an anode terminal connected to the source terminal of the first MOSFET; and a second diode having a cathode terminal connected to the drain terminal of the third MOSFET, and an anode terminal connected to the source terminal of the fourth MOSFET.

10. A motor system, comprising:

a stator including a plurality of permanent magnets;

a rotor situated to rotate relative to the stator;

a plurality of phase windings including first, second and third phase windings situated in the stator;

a power circuit connected to the phase windings, wherein the power circuit includes a power inverter;

a controller configured to output control signals to the power circuit to selectively energize the phase windings to cause the rotor to rotate relative to the stator;

a neutral switch circuit connected between the phase windings and a neutral node and configured to selectively disconnect the phase windings from the neutral node;

first, second and third sense resistors connected between the power inverter and the respective first, second and third phase windings, and wherein the controller is configured to output a control signal to the neutral switch circuit to selectively disconnect the phase windings from the neutral node.

11. The system of claim 10, wherein the neutral switch circuit includes:

first and second switches connected in series between the first phase winding and the neutral node; and third and fourth switches connected in series between the second phase winding and the neutral node.

12. The system of claim 10, wherein the controller is configured to disconnect the phase windings from the neutral node in response to a fault in the plurality of phase windings.

13. The system of claim 10, wherein the first, second and third phase windings each include a main winding and a redundant winding.

14. A motor control system, comprising:

a first switch having a first terminal and a second terminal, the first terminal configured for connection to a first phase winding of a three phase brushless DC (BLDC) motor;

a second switch having a first terminal and a second terminal, the first terminal configured for connection to a neutral node of the BLDC motor, the second terminal connected to the second terminal of the first switch;

a third switch having a first terminal and a second terminal, the first terminal configured for connection to a second phase winding of the BLDC motor;

a fourth switch having a first terminal and a second terminal, the first terminal configured for connection to the neutral node of the BLDC motor, the second terminal connected to the second terminal of the third switch; and a controller configured to output a control signal to the first, second, third and fourth switches to selectively disconnect the first and second phase windings of the BLDC motor from the neutral node in response to a fault in at least one phase winding of the BLDC motor.

15. The system of claim 14, wherein the first, second, third and fourth switches comprise respective first, second, third and fourth MOSFETs;

wherein the first terminals of each of the first, second, third and fourth MOSFETs are drain terminals; and wherein the second terminals of each of the first, second, third and fourth MOSFETs are source terminals.

16. The system of claim 15, further comprising:

a first diode having a cathode terminal connected to the drain terminal of the first MOSFET, and an anode terminal connected to the source terminal of the first MOSFET; and a second diode having a cathode terminal connected to the drain terminal of the third MOSFET, and an anode terminal connected to the source terminal of the fourth MOSFET.

17. The system of claim 14, wherein the controller is configured to disconnect the first and second phase windings and a third phase winding of the BLDC motor from a power inverter in response to the fault in the at least one phase winding.

18. A method, comprising:

providing a three phase brushless DC (BLDC) motor having first, second and third phase windings;

providing a first MOSFET having a drain terminal and a source terminal, the drain terminal connected to the first phase winding;

providing a second MOSFET having a drain terminal and a source terminal, the drain terminal connected to a neutral node of the BLDC motor, the source terminal connected to the source terminal of the first MOSFET;

providing a third MOSFET having a drain terminal and a source terminal, the drain terminal connected to the second phase winding;

providing a fourth MOSFET having a drain terminal and a source terminal, the drain terminal connected to the neutral node of the BLDC motor, the source terminal connected to the source terminal of the third MOSFET;

outputting a first control signal to the first, second, third and fourth MOSFETs to connect the first and second phase windings to the neutral node; and outputting a second control signal to the first, second, third and fourth MOSFETs to selectively disconnect the first and second phase windings from the neutral node in response to a fault in at least one of the first, second and/or third phase windings.

19. The method of claim 18, further comprising:

monitoring current in the first, second and third phase windings; and determining the fault in the at least one of the first, second and third phase windings based on the monitoring.

20. The method of claim 18, further comprising:

outputting energization current to the first, second and third phase windings to selectively rotate a rotor of the BLDC motor; and removing the energization current from the first, second and third phase windings in response to the fault in the at least one of the first, second and third phase windings.

* * * * *